United States Patent
Kogo

(10) Patent No.: US 11,527,896 B2
(45) Date of Patent: Dec. 13, 2022

(54) CONTROL APPARATUS, POWER MANAGEMENT SYSTEM, CONTROL METHOD, AND NON-TRANSITORY STORAGE MEDIUM

(71) Applicant: NEC Corporation, Tokyo (JP)

(72) Inventor: Takuma Kogo, Tokyo (JP)

(73) Assignee: NEC CORPORATION, Tokyo (JP)

(*) Notice: Subject to any disclaimer, the term of this patent is extended or adjusted under 35 U.S.C. 154(b) by 81 days.

(21) Appl. No.: 17/053,613

(22) PCT Filed: Feb. 1, 2019

(86) PCT No.: PCT/JP2019/003578
§ 371 (c)(1),
(2) Date: Nov. 6, 2020

(87) PCT Pub. No.: WO2019/215967
PCT Pub. Date: Nov. 14, 2019

(65) Prior Publication Data
US 2021/0075226 A1   Mar. 11, 2021

(30) Foreign Application Priority Data
May 9, 2018   (JP) .............................. JP2018-090731

(51) Int. Cl.
  *G05B 19/042* (2006.01)
  *H02J 7/00* (2006.01)
  *H02J 3/32* (2006.01)

(52) U.S. Cl.
  CPC .......... *H02J 7/0013* (2013.01); *G05B 19/042* (2013.01); *H02J 3/32* (2013.01);
  (Continued)

(58) Field of Classification Search
  None
  See application file for complete search history.

(56) References Cited

U.S. PATENT DOCUMENTS

| | | | | |
|---|---|---|---|---|
| 7,839,027 B2* | 11/2010 | Shelton | ...................... | H02J 3/32 307/102 |
| 9,092,832 B2* | 7/2015 | Osogami | ............ | G06Q 30/0283 |
| 9,685,799 B2* | 6/2017 | Kaji | ........................ | H02J 7/007 |

(Continued)

FOREIGN PATENT DOCUMENTS

| JP | 2010-048759 A | 3/2010 |
|---|---|---|
| JP | 2015-177623 A | 10/2015 |

(Continued)

OTHER PUBLICATIONS

International Search Report for PCT Application No. PCT/JP2019/003578, dated Apr. 2, 2019.

*Primary Examiner* — Jason Lin
(74) *Attorney, Agent, or Firm* — Sughrue Mion, PLLC

(57) ABSTRACT

The present invention provides a control apparatus (100) that includes a remaining capacity change model determination unit (120) that determines a remaining capacity change model that estimates a temporal change of a remaining capacity which is based on charging/discharging in accordance with a first energy service for each of a plurality of energy storage systems that perform charging/discharging in accordance with energy services; and an operation planning unit (130) that computes a charging/discharging plan of each of the plurality of energy storage systems based on the remaining capacity change model of each of the plurality of energy storage systems.

13 Claims, 9 Drawing Sheets

(52) U.S. Cl.
CPC .... *H02J 7/0048* (2020.01); *G05B 2219/2639* (2013.01); *H02J 3/322* (2020.01)

(56) References Cited

U.S. PATENT DOCUMENTS

| | | | | |
|---|---|---|---|---|
| 10,535,999 | B2* | 1/2020 | Hidaka | H01M 10/441 |
| 10,547,180 | B2* | 1/2020 | Crawford | H02J 7/0029 |
| 2012/0133333 | A1* | 5/2012 | Morioka | H02J 3/383 |
| | | | | 320/134 |
| 2012/0249152 | A1* | 10/2012 | Nishibayashi | H02J 13/0062 |
| | | | | 324/430 |
| 2013/0229149 | A1* | 9/2013 | Sortomme | H02J 7/00 |
| | | | | 320/109 |
| 2013/0300374 | A1* | 11/2013 | Tomita | H01M 10/441 |
| | | | | 320/134 |
| 2014/0114829 | A1* | 4/2014 | Forbes, Jr. | B60L 53/64 |
| | | | | 705/35 |
| 2014/0214219 | A1* | 7/2014 | Katayama | H02J 13/00034 |
| | | | | 700/291 |
| 2014/0217989 | A1* | 8/2014 | Kudo | H02J 7/0021 |
| | | | | 320/134 |
| 2014/0266054 | A1* | 9/2014 | Faries | H02J 3/32 |
| | | | | 320/128 |
| 2014/0347016 | A1* | 11/2014 | Becker | G05B 15/02 |
| | | | | 320/136 |
| 2015/0035359 | A1* | 2/2015 | Chung | H02J 3/00 |
| | | | | 307/23 |
| 2015/0142187 | A1* | 5/2015 | Yamane | G06Q 10/04 |
| | | | | 700/286 |
| 2015/0261239 | A1* | 9/2015 | Zhang | G06Q 30/0283 |
| | | | | 700/291 |
| 2016/0226249 | A1* | 8/2016 | Sakuma | H02J 13/00034 |
| 2017/0310140 | A1* | 10/2017 | Asghari | H02J 3/32 |

FOREIGN PATENT DOCUMENTS

| | | |
|---|---|---|
| JP | 5789794 B2 | 10/2015 |
| JP | 2017-050911 A | 3/2017 |
| WO | 2015/037654 A1 | 3/2015 |

* cited by examiner

CONTROL APPARATUS, POWER MANAGEMENT SYSTEM, CONTROL METHOD, AND NON-TRANSITORY STORAGE MEDIUM

This application is a National Stage Entry of PCT/JP2019/003578 filed on Feb. 1, 2019, which claims priority from Japanese Patent Application 2018-090731 filed on May 9, 2018, the contents of all of which are incorporated herein by reference, in their entirety.

TECHNICAL FIELD

The present invention relates to a control apparatus, a power management system, a control method, and a program, and more specifically, to a control apparatus, a control method, and a program for charging/discharging plan of an energy storage system connected to a power system.

BACKGROUND ART

Patent Documents 1 and 2 disclose a technology for managing energy storage systems of a plurality of power consumers and for performing charging/discharging in accordance with various energy services.

Patent Document 1 discloses a technology for causing the energy storage systems of a plurality of power consumers to perform charging/discharging in order to regulate a frequency of the power system. Specifically, Patent Document 1 discloses a power control system including a central load dispatching office, storage battery supervisory control and data acquisition (SCADA), and a local charging/discharging system (a local charging/discharging apparatus/an energy storage apparatus).

The central load dispatching office creates a charging/discharging gain line at a predetermined cycle and transmits the result to the storage battery SCADA. The storage battery SCADA computes a sharing coefficient of each local charging/discharging system based on the charging/discharging gain line received from the central load dispatching office at a predetermined cycle, and transmits the result to each local charging/discharging system. The local charging/discharging system detects a frequency deviation in a predetermined cycle and computes an output command value based on the detected frequency deviation and the sharing coefficient. Then, the local charging/discharging system outputs the power according to the computed output command value.

Patent Document 2 discloses a technology for causing the energy storage system of each of a plurality of power consumers to perform charging/discharging in accordance with a plurality of energy services. Specifically, a control method for controlling an energy storage system connected to the power system is disclosed. The control method includes a step of determining at least two different energy services for operating the energy storage system, a step of determining a priority of the two different energy services based on predetermined criteria, a step of operating the energy storage system so as to provide a total power for performing the two different energy services to the power system from the energy storage system if the energy storage system is operated to perform the two different energy services in parallel, a step of reducing the power providing for performing the energy service having lower priority among the two different energy services in order to regulate the total power to be within a power limit if the total power is not within the power limit of the energy storage system.

RELATED DOCUMENT

Patent Document

[Patent Document 1] International Patent Publication No. WO2015/037654
[Patent Document 2] Japanese Patent No. 5789794

SUMMARY OF THE INVENTION

Technical Problem

As disclosed in Patent Document 2, the energy storage system can be more effectively used by causing the energy storage system of each of the power consumers to perform charging/discharging in accordance with a plurality of energy services. However, in the technology disclosed in Patent Document 2, the charging/discharging output of the energy storage system is determined by taking only a current state into consideration. Therefore, it may be difficult to perform charging/discharging so as to respond to a plurality of energy service requests (charging/discharging, reserving the remaining capacity, and the like.). For example, when it is desired to discharge in accordance with a certain energy service, there may be a situation in which the remaining capacity of the energy storage system is insufficient.

Similarly, in the technology disclosed in Patent Document 1 also, since the charging/discharging output of the energy storage system is determined by taking only a current state into consideration, it is difficult to solve the problems described above.

An object of the present invention is to compute a charging/discharging plan for a plurality of energy storage systems so as to respond to a plurality of energy service requests.

Solution to Problem

According to the present invention, there is provided a control apparatus that includes:
a remaining capacity change model determination unit that determines a remaining capacity change model that estimates a temporal change of a remaining capacity which is based on charging/discharging in accordance with a first energy service for each of a plurality of energy storage systems that perform charging/discharging in accordance with energy services; and
an operation planning unit that computes a charging/discharging plan of each of the plurality of energy storage systems based on the remaining capacity change model of each of the plurality of energy storage systems.

In addition, according to the present invention,
there is provided a power management system that includes: the control apparatus; and an energy storage system that performs charging/discharging based on a charging/discharging plan determined by the control apparatus.

In addition, according to the present invention,
there is provided a control method executed by a computer, the method includes:
a remaining capacity change model determination step of determining a remaining capacity change model that estimates a temporal change of a remaining capacity which is based on charging/discharging in accordance with a first energy service for each of a plurality of energy storage systems that perform charging/discharging in accordance with energy services; and an operation planning step of computing a charging/discharging plan of each of the plurality of energy storage systems based on the remaining capacity change model of each of the plurality of energy storage systems.

In addition, according to the present invention, there is provided a program that causes a computer to functions as:

a remaining capacity change model determination unit that determines a remaining capacity change model that estimates a temporal change of a remaining capacity which is based on charging/discharging in accordance with a first energy service for each of a plurality of energy storage systems that perform charging/discharging in accordance with energy services; and an operation planning unit that computes a charging/discharging plan of each of the plurality of energy storage systems based on the remaining capacity change model of each of the plurality of energy storage systems.

Advantageous Effects of Invention

According to the present invention, it is possible to compute charging/discharging plans for a plurality of energy storage systems so as to respond to a plurality of energy service requests.

BRIEF DESCRIPTION OF THE DRAWINGS

The above-described object, other objects, features and advantages will be further clarified by the preferred example embodiments described below and the accompanying drawings.

DESCRIPTION OF EMBODIMENTS

First Example Embodiment

Figure 1:
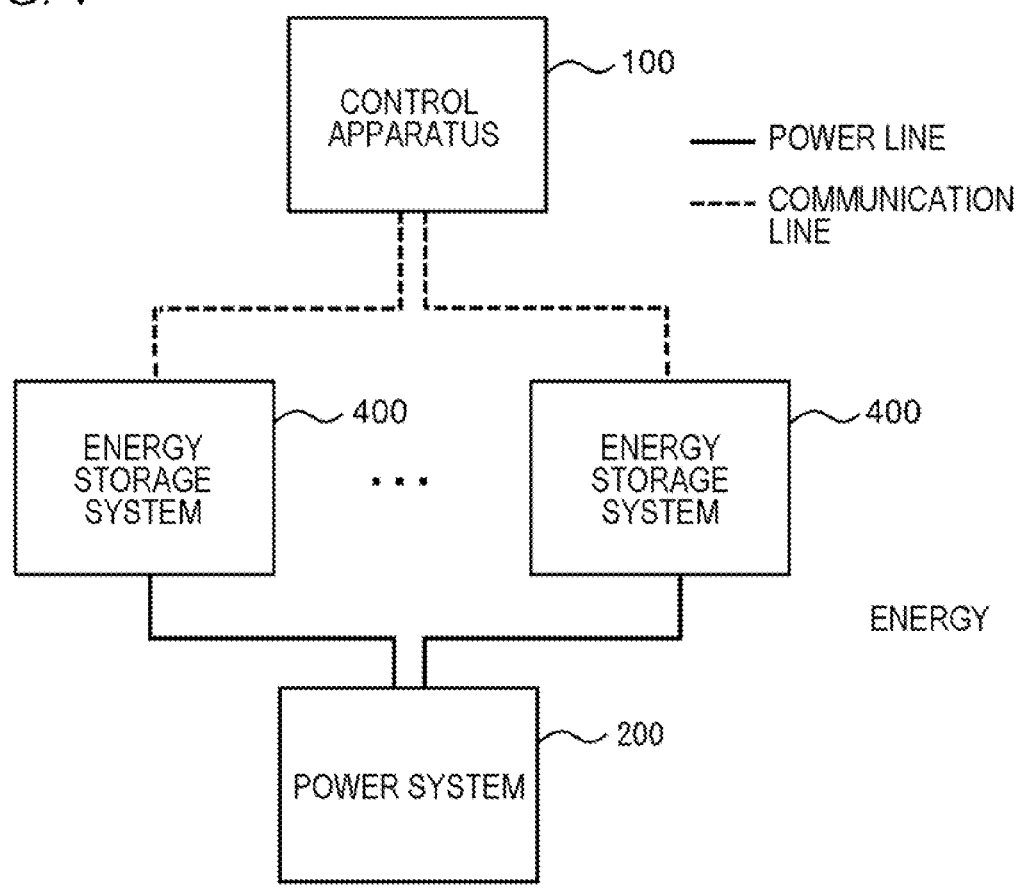
FIG. 1 is an example of a functional block diagram of a power management system in a present example embodiment.

First, an overview and an outline of a power management system in the present example embodiment will be described using FIG. 1. As illustrated, the power management system includes a control apparatus 100 and a plurality of energy storage systems 400. The control apparatus 100 and each of a plurality of energy storage systems 400 are connected via a communication line so as to communicate with each other. The communication line may be implemented in any form regardless of a communication line access method such as a leased line, the Internet, a virtual private network (VPN), or a physical form of the communication line such as a wired line and a wireless line.

The energy storage system 400 includes a storage battery. The energy storage system 400 may be a stationary type or an electric vehicle. The energy storage system 400 is used by power consumers.

Each power consumer individually participates in one or a plurality of energy services. Then, the energy storage system 400 of each power consumer performs charging/discharging in accordance with the energy service the power consumer participates in. In the present example embodiment, details of the energy service are not particularly limited. An example of the energy service is disclosed in Patent Document 2. The power consumer requests an aggregator to control the charging/discharging in accordance with the participating energy service.

The control apparatus 100 is used by the aggregator. The control apparatus 100 computes the charging/discharging plan of each of a plurality of energy storage systems 400 so that the charging/discharging can be performed in accordance with a plurality of energy services. Each of a plurality of energy storage systems 400 performs the charging/discharging according to the charging/discharging plan computed by the control apparatus 100. Note that, the control apparatus 100 is a server. The server may be a cloud server or on-premises.

Next, a configuration of the control apparatus 100 that computes the charging/discharging plan of each of a plurality of energy storage systems 400 will be described in detail. First, an example of a hardware configuration of the control apparatus 100 will be described. Each functional unit included in the control apparatus 100 in the present example embodiment is realized by any combination of hardware and software, centered on a central processing unit (CPU) of any computer, a memory, a program loaded in the memory, a storage unit such as a hard disk storing the program (in addition to programs that are stored in advance when the apparatus is shipped, programs that are downloaded from storage media such as a compact disc (CD) or a server on the Internet can be stored), and a network connection interface. Then, it will be understood by those skilled in the art that there are various modified examples of the method and apparatus for realizing the functions.

Figure 2:
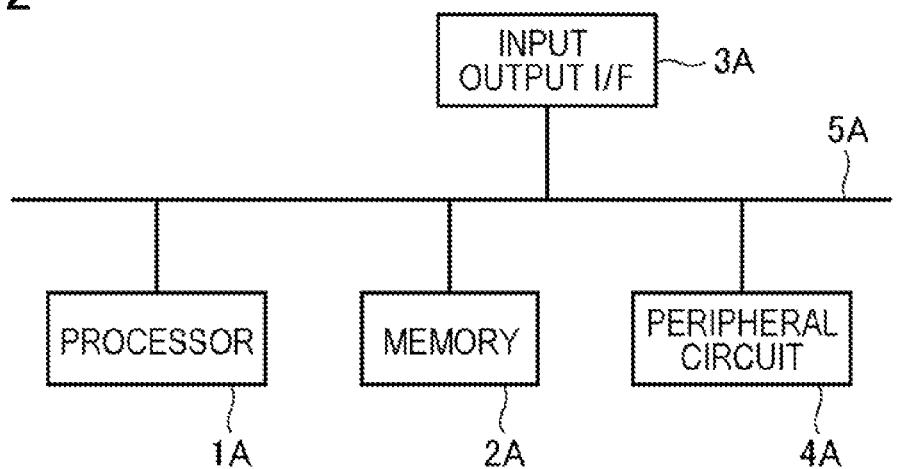
FIG. 2 is a diagram illustrating an example of a hardware configuration of a control apparatus in the present example embodiment.

FIG. 2 is a block diagram illustrating an example of a hardware configuration of the control apparatus 100 in the present example embodiment. As illustrated in FIG. 2, the control apparatus 100 includes a processor 1A, a memory 2A, an input output interface 3A, a peripheral circuit 4A, and a bus 5A. The peripheral circuit 4A includes various modules. The control apparatus 100 may not include the peripheral circuit 4A.

The bus 5A is a data transmission path for the processor 1A, the memory 2A, the peripheral circuit 4A, and the input output interface 3A to transmit and receive data to and from each other. The processor 1A is an arithmetic processing device such as a CPU or a graphics processing unit (GPU). The memory 2A is a memory such as a random access memory (RAM) or a read only memory (ROM). The input output interface 3A includes an interface for acquiring information from an input device, an external device, an external server, an external sensor, and the like, and an interface for outputting information to an output device, an external device, an external server, or the like. The input device is, for example, a keyboard, a mouse, a microphone, or the like. The output device is, for example, a display, a speaker, a printer, a mailer, or the like. The processor 1A can issue a command to each module and can perform an arithmetic calculation based on the result of the arithmetic calculation of each module.

Figure 3:
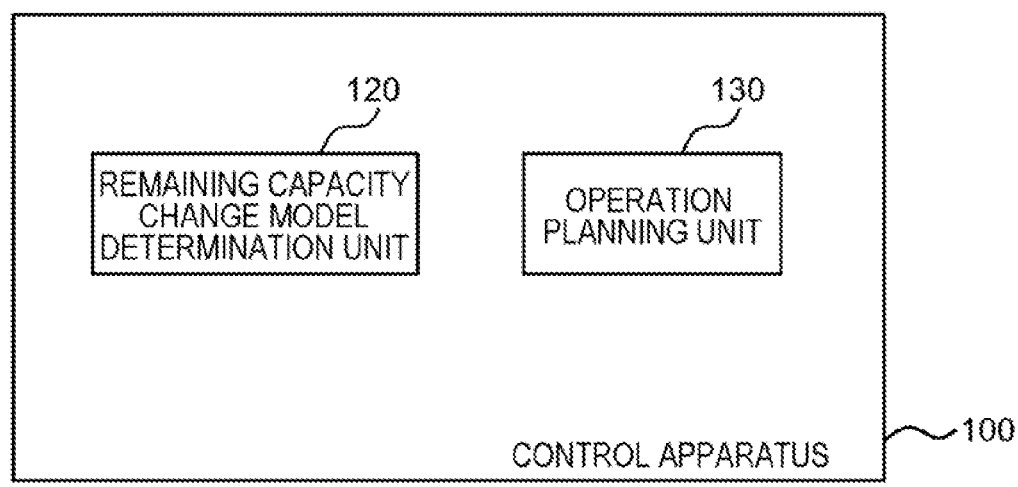
FIG. 3 is a diagram illustrating an example of a functional block diagram of the control apparatus in the present example embodiment.

Next, a functional configuration of the control apparatus 100 will be described. An example of the functional block diagram of the control apparatus 100 is illustrated in FIG. 3. As illustrated, the control apparatus 100 includes a remaining capacity change model determination unit 120 and an operation planning unit 130.

The remaining capacity change model determination unit 120 determines a remaining capacity change model for estimating a temporal change of the remaining capacity [Wh] which is based on the charging/discharging in accordance with a first energy service, of each of a plurality of energy storage systems 400 that perform the charging/discharging in accordance with one or a plurality of energy services. The operation planning unit 130 computes the charging/discharging plan for each of a plurality of energy storage systems 400 based on the remaining capacity change model for each of a plurality of energy storage systems 400.

The control apparatus 100 in the present example embodiment makes it possible to compute the charging/discharging plan for each of a plurality of energy storage systems 400 while taking the temporal change (the result of estimation) of the remaining capacity of the energy storage system 400 based on the charging/discharging in accordance with the first energy service into consideration. This point makes this technology different from the technologies disclosed in Patent Documents 1 and 2 in which the charging/discharging output of the energy storage system 400 is determined by taking only the current state into consideration. With the control apparatus 100 in the present example embodiment in which the charging/discharging plan can be computed while taking the temporal change (the result of estimation) of the remaining capacity of the energy storage system 400 based on the charging/discharging in accordance with the first energy service into consideration, it is possible to compute the charging/discharging plan for each of a plurality of energy storage systems 400 with an insight into the future situation. As a result, it is possible to compute the charging/discharging plan of each of a plurality of energy storage systems 400 so as to respond to a plurality of energy service requests (charging/discharging, reserving the remaining capacity, or the like).

Second Example Embodiment

A control apparatus 100 in the present example embodiment has a configuration similar to that of the control apparatus 100 in the first example embodiment. In addition, the configuration of the control apparatus 100 in the present example embodiment is more detailed. The details will be described below.

First, the energy service will be described. The power consumer in the present example embodiment participates in one or a plurality of the following energy services.

"Frequency Regulation Service"

The energy storage system 400 of the power consumer who participated in the service performs the charging/discharging according to a frequency fluctuation (that is, a frequency deviation) of the power system in order to keep the frequency of the power system at a reference frequency. Specifically, there are frequency regulations such as a governor-free for regulating a minute fluctuation and a load frequency control (LFC) for regulating a short-cycle component. Note that, an upper limit value [W] of charging/discharging of each energy storage system 400 is set in advance for the service. Then, each energy storage system 400 performs the charging/discharging in accordance with the service within the range of equal to or smaller than the upper limit value. If the charging/discharging value [W] determined according to the frequency fluctuation is equal to or smaller than the upper limit value, the energy storage system 400 performs the charging/discharging at the determined value. On the other hand, if the charging/discharging value determined according to the frequency fluctuation exceeds the upper limit value, the energy storage system 400 performs the charging/discharging at the upper limit value. The means for determining the charging/discharging value according to the frequency fluctuation is not particularly limited, and any technology can be adopted.

Hereinafter, the upper limit value will be referred to as "reserved frequency regulation energy $Pfr\_i,t$". The subscript "i" is a serial number of a plurality of energy storage systems 400. That is, the reserved frequency regulation energy Pfr is set for each energy storage system 400. In the present example embodiment, 24 hours are divided into a plurality of sub-time slots per each unit time, and various processes are performed for each sub-time slot. The subscript "t" is a serial number of the sub-time slot. That is, the reserved frequency regulation energy Pfr can be set for each sub-time slot. In the present example embodiment, the unit time is set to 15 minutes, but not limited to this (the same applies hereinafter).

The power consumer participating in the service receives a compensation corresponding to the reserved frequency regulation energy $Pfr\_i,t$ from a business operator that manages the power system. The larger the reserved frequency regulation energy $Pfr\_i,t$ is, the more profit the power consumer can obtain.

"Backup Service"

The energy storage system 400 of the power consumer participating in the service is controlled so that the remaining capacity is always equal to or larger than a predetermined energy amount [Wh]. That is, the charging/discharging of the energy storage system 400 is controlled so that the remaining capacity is not below the predetermined energy amount.

The power consumer participating in the service can always reserve the predetermined energy amount in the energy storage system 400. Therefore, when an unexpected trouble such as a power failure occurs, the energy reserved by the service can be used.

"Peak-Cut Service"

When a power demand [W] of each power consumer exceeds an upper limit set in advance, the energy storage system 400 of the power consumer participating in the service discharges so that the power demand does not exceed the upper limit set in advance. The power demand in the present example embodiment is defined as a power supplied from the power system to the facilities of each power consumer via a distribution board. For example, the power demand is the sum of the power consumption [W] due to the load (electronic and electrical devices, and the like) operating in the facilities of each power consumer and the charging power [W] of the energy storage system 400. The power consumer participating in the service can keep the power demand equal to or smaller than the upper limit set in advance.

"Cost Management Service"

The energy storage system 400 of the power consumer participating in the service performs the charging/discharging at a time determined based on power purchasing unit prices [/kWh] different for each time slot. Specifically, the energy storage system 400 discharges at the time slot in which the power purchasing unit price is relatively high, and charges at the time slot in which the power purchasing unit price is relatively low. The power consumer participating in the service can keep the power purchasing charges low.

Next, the configurations of the power management system and the control apparatus 100 of the present example embodiment will be described. Note that, the overview and outline of the power management system, and the hardware configuration of the control apparatus 100 are the same as those in the first example embodiment.

Figure 4:
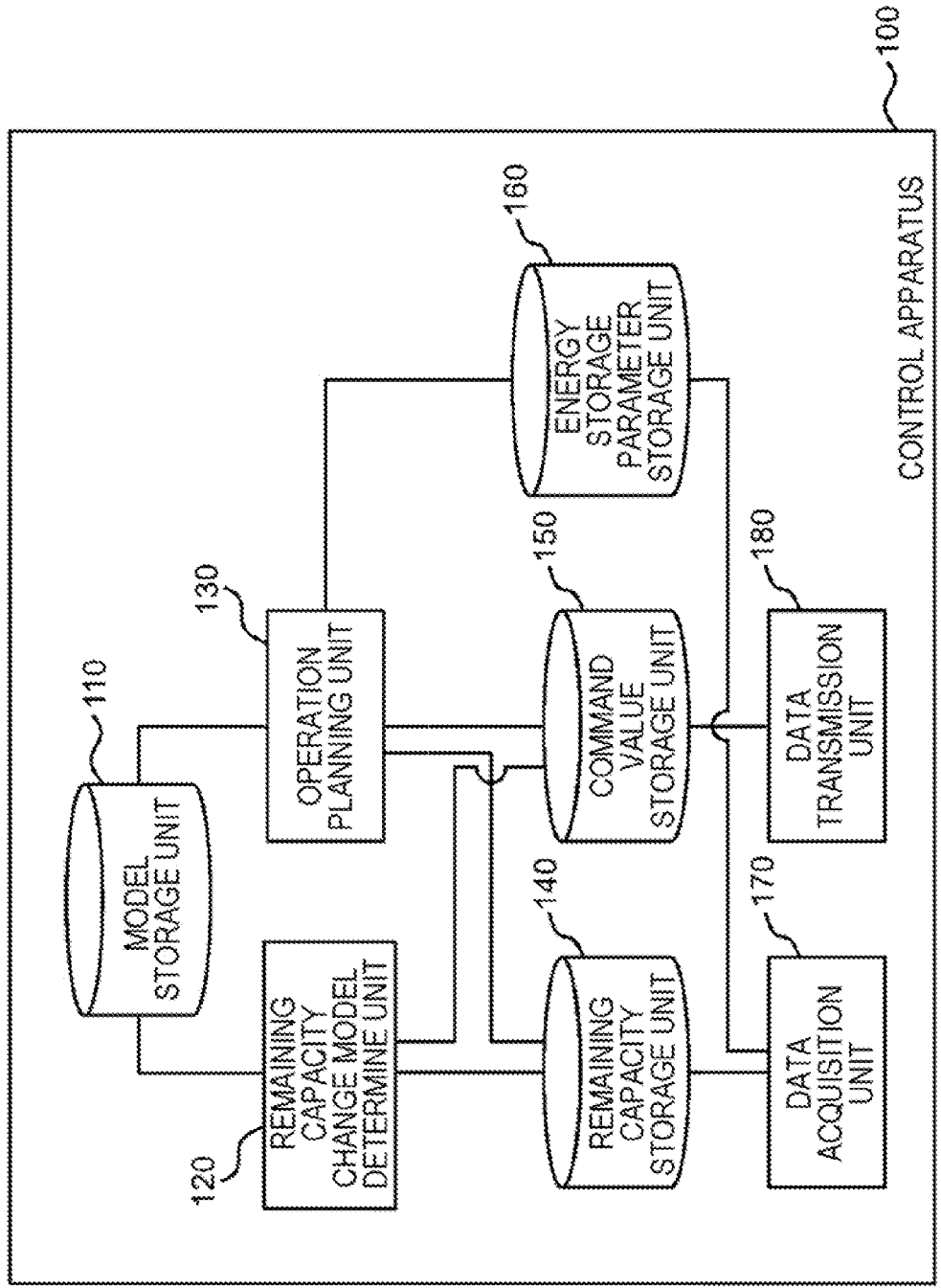
FIG. 4 is a diagram illustrating an example of a functional block diagram of the control apparatus in the present example embodiment.
Figure 5:
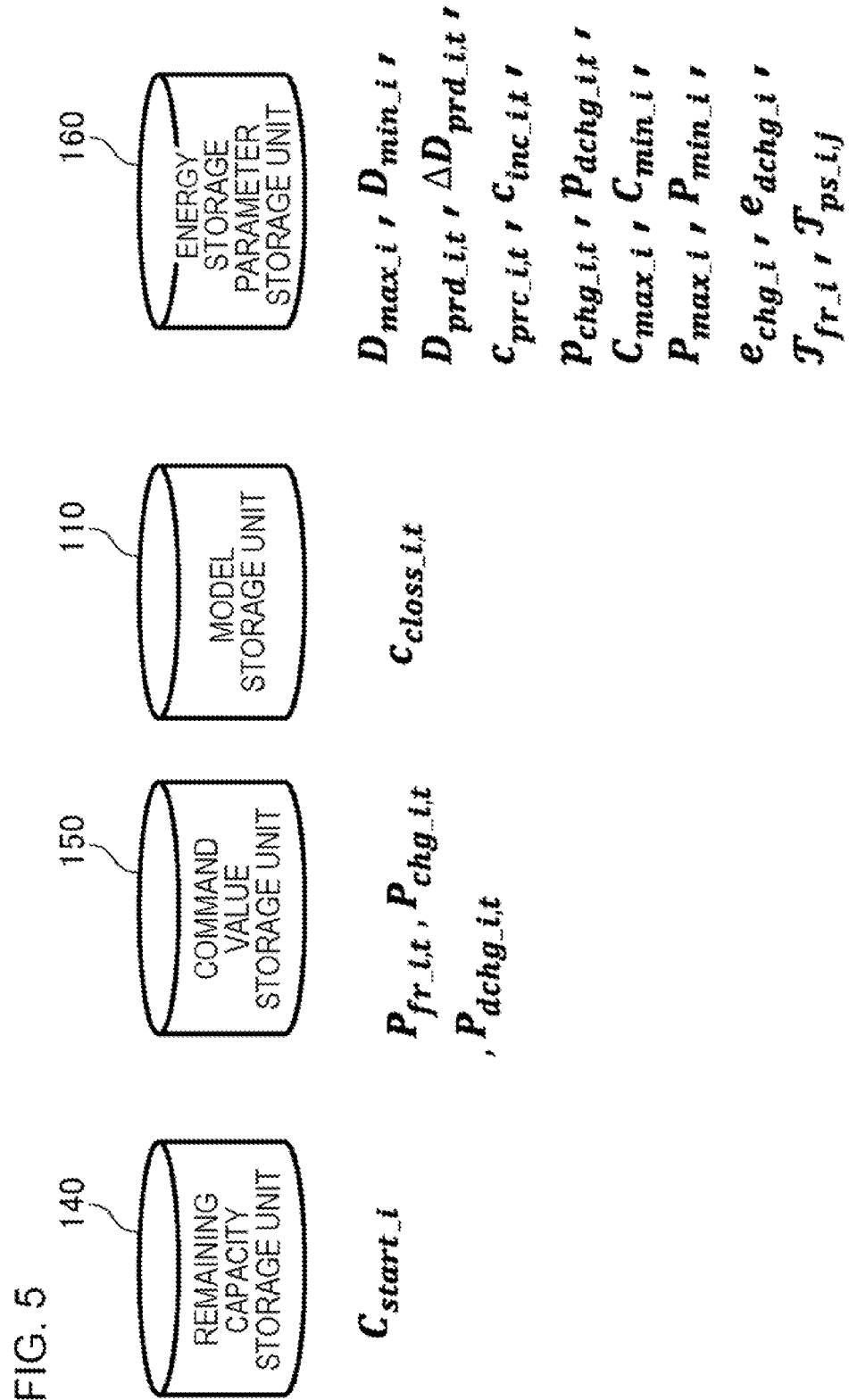
FIG. 5 is a diagram illustrating an example of information stored in each storage unit in the present example embodiment.

An example of a functional block diagram of the control apparatus 100 is illustrated in FIG. 4. As illustrated, the control apparatus 100 includes a model storage unit 110, a remaining capacity change model determination unit 120, an operation planning unit 130, a remaining capacity storage unit 140, a command value storage unit 150, an energy storage parameter storage unit 160, a data acquisition unit 170, and a data transmission unit 180. Parameter values stored in each of the model storage unit 110, the remaining capacity storage unit 140, the command value storage unit 150, and the energy storage parameter storage unit 160 are as illustrated in FIG. 5. Each parameter illustrated in the figure will be described below.

The data acquisition unit 170 illustrated in FIG. 4 acquires various kinds of data. The data acquired by the data acquisition unit 170 are stored in the remaining capacity storage unit 140 and the energy storage parameter storage unit 160. Here, various kinds of data acquired by the data acquisition unit 170 will be exemplified.

"$Cstart\_i$" is the current remaining capacity [Wh] of the energy storage system 400. The data acquisition unit 170 acquires the value for each energy storage system 400. This assumption applies to other parameters with the subscript "i".

"$Cmax\_i$" is the upper limit of the remaining capacity of the energy storage system 400. The charging/discharging plan is computed in accordance with the energy service so that the remaining capacity does not exceed $Cmax\_i$. $Cmax\_i$ is determined by each power consumer in the range of larger than 0 [Wh] and equal to or smaller than a rated capacity.

"$Cmin\_i$" is the lower limit of the remaining capacity of the energy storage system 400. The charging/discharging plan is computed in accordance with the energy service so that the remaining capacity is not equal to or smaller than $Cmin\_i$. $Cmin\_i$ is determined by each power consumer in the range of equal to or larger than 0 [Wh] and smaller than the rated capacity. Note that, $Cmin\_i<Cmax\_i$. $Cmin\_i$ is the energy amount that is always reserved by the backup service.

"$Dmax\_i$" is the upper limit of the power demand of a power consumer who owns each energy storage system 400. As described above, the power demand is the power supplied from the power system to the facilities of each power consumer via the distribution board. The upper limit set in advance in the peak-cut service is $Dmax\_i$. $Dmax\_i$ is determined by each power consumer based on details of a contract with an electric power company.

"$Dmin\_i$" is the lower limit of the power demand of the power consumer who owns each energy storage system 400. That is determined by each power consumer. By setting $Dmin\_i$ to a value of equal to or larger than 0, a reverse power flow can be prevented from occurring. Note that, $Dmin\_i<Dmax\_i$.

"$cprc\_i,t$" is a unit price [/kWh] of the power purchased by the power consumer who owns each energy storage system 400 from the electric power company. The data acquisition unit 170 acquires the value in each of a plurality of sub-time slots. This assumption applies to other parameters with the subscript "t".

"$cinc\_i,t$" is the compensation received by the power consumer according to the reserved frequency regulation energy $Pfr\_i,t$ described in the frequency regulation service.

"$Dprd\_i,t$" is the temporal change of the predicted value of the power consumption [W] of the power consumer who owns each energy storage system 400. The power consumption in the present example embodiment is defined as the power consumed by the loads (electronic and electrical device, or the like) operating in the facility of each power consumer. The power consumption can be predicted based on, for example, the weather, temperature, month, day of the week, past power consumption record, and the like, but since the technology is widely known, the description thereof will not be repeated here.

"$\Delta Dprd\_i,t$" is an error width [W] of the predicted value $Dprd\_i,t$ of the power consumption [W] of the power consumer who owns each energy storage system 400. Since the technology for computing the error width is widely known, the description thereof will be omitted here.

"$Pmax\_i$" is an upper limit [W] of the charging/discharging output of each energy storage system 400. The charging/discharging plan is computed in accordance with the energy service so that the charging/discharging output does not exceed $Pmax\_i$. $Pmax\_i$ is determined by each power consumer within a range of larger than 0 [W] and equal to or smaller than the rated output.

"$Pmin\_i$" is a lower limit [W] of the charging/discharging output of each energy storage system 400. The charging/discharging plan is computed in accordance with the energy service so that the charging/discharging output is not below $Pmin\_i$. $Pmin\_i$ is determined by each power consumer in the range of equal to or larger than 0 [W] and smaller than the rated output. Note that, $Pmin\_i<Pmax\_i$. $Pmin\_i$ is basically "0".

"$edchg\_i$" is a discharge efficiency of each energy storage system 400. $edchg\_i$ is in a range of from equal to or higher than 0 to equal to or lower than 1.

"$echg\_i$" is a charge efficiency of each energy storage system 400. $echg\_i$ is in a range of from equal to or higher than 0 to equal to or lower than 1.

The data acquisition unit 170 may acquire at least a part of the above-described various kinds of data from each of a plurality of energy storage systems 400. Alternatively, the operator may input the above-described various kinds of data through an input device connected to the control apparatus 100. Then, the data acquisition unit 170 may acquire at least a part of the above-described various kinds of data from the input device. In addition, the data acquisition unit 170 may acquire at least a part of the above-described various kinds of data from another external device configured to be able to communicate with the control apparatus 100.

For the data of which value fluctuates in a short cycle such as $Cstart\_i$, it is preferable that the data acquisition unit 170 repeatedly acquire the values in a short cycle. The data acquisition unit 170 can acquire the value of data of which value fluctuates in a short cycle such as $Cstart\_i$ in a cycle same as the cycle of determining the remaining capacity change model by the remaining capacity change model determination unit 120 or the cycle of computing the charging/discharging plan by the operation planning unit 130, or in a cycle shorter than that.

In contrast, for the data of which value does not fluctuate or of which value fluctuates in a long cycle (data of which value almost does not fluctuate in a short cycle), the data acquisition unit 170 does not need to repeatedly acquire the values in a short cycle. Once the data acquisition unit 170 firstly acquires the value of such data only once and stores the value in the energy storage parameter storage unit 160, the data acquisition unit 170 does not need to acquire the value of data thereafter. In addition, the data acquisition unit 170 may repeatedly acquire the value of such data in a cycle longer than the cycle of repeatedly acquiring the data of which value fluctuates in a short cycle such as Cstart_i.

In addition, the data acquisition unit 170 may acquire information indicating which energy service each power consumer participates in, and store the result in the energy storage parameter storage unit 160.

Returning to FIG. 4, the remaining capacity change model determination unit 120 determines the remaining capacity change model for estimating the temporal change of the remaining capacity which is based on the charging/discharging in accordance with the first energy service, of each of a plurality of energy storage systems 400 that perform the charging/discharging in accordance with the energy services.

In the present example embodiment, the first energy service is a frequency regulation service. Note that, since it is difficult to predict the fluctuation of a system frequency, it is difficult to estimate the charging/discharging power [W] at each time in accordance with that service. However, it is possible to estimate the charging/discharging energy amount [Wh] for each sub-time slot because a trend can be observed. Therefore, the remaining capacity change model determination unit 120 determines the remaining capacity change model that estimates an amount of change in the remaining capacity for each sub-time slot (each unit time).

Specifically, the remaining capacity change model determination unit 120 acquires learning data that includes the upper limit value (reserved frequency regulation energy Pfr_i,t) of charging/discharging in accordance with the first energy service and a record of amount of change of the remaining capacity for each sub-time slot (each unit time) based on the charging/discharging in accordance with the first energy service, for each energy storage system 400. The reserved frequency regulation energy Pfr_i,t is an explanatory variable, and the amount of change of the remaining capacity for each sub-time slot (for each unit time) is an objective variable.

Then, the remaining capacity change model determination unit 120 determines a parameter of the remaining capacity change model by using learning data of each energy storage system 400 for each energy storage system 400. The remaining capacity change model is preferably a linear function or a piecewise linear function (including piecewise linear convex function). As a method of determining the parameter of the remaining capacity change model, a least square method or a robust determination method such as support vector regression can be used.

In the present example embodiment, the remaining capacity change model is a linear function as illustrated in following Equation (1). ΔCfr_i,t is the amount of change of the remaining capacity at the t-th sub-time slot of the i-th energy storage system 400.

$$\Delta C_{fr\_i,t} = c_{closs\_i,t} P_{fr\_i,t} \Delta \tau \quad \text{Equation 1}$$

The remaining capacity change model determination unit 120 determines ccloss_i,t for each energy storage system 400 and for each sub-time slot, and stores the result in the model storage unit 110. Note that, an initial value of ccloss_i,t may be stored in the model storage unit 110. In this way, even if ccloss_i,t cannot be determined because the amount of learning data is insufficient, the processing by the operation planning unit 130 using ccloss_i,t can be performed.

Note that, the remaining capacity change model determination unit 120 may perform the determination of ccloss_i,t asynchronously with the operation planning unit 130, the data acquisition unit 170, the data transmission unit 180 and the like. For example, when the operation planning unit 130 performs the computation of the charging/discharging plan in the cycle T1, the remaining capacity change model determination unit 120 may perform the determination of ccloss_i,t in the cycle T2 (Note that, T1<T2). In addition, when it is detected that a prediction accuracy of the remaining capacity change model is smaller than a reference value, the remaining capacity change model determination unit 120 may perform the determination of ccloss_i,t. Note that, the remaining capacity change model determination unit 120 may perform the determination of ccloss_i,t in synchronization with at least a part of the operation planning unit 130, the data acquisition unit 170, and the data transmission unit 180.

The operation planning unit 130 computes the charging/discharging plan for each of a plurality of energy storage systems 400 based on the remaining capacity change model for each of a plurality of energy storage systems 400. The operation planning unit 130 computes the charging/discharging plan of the energy storage system 400 of each power consumer so as to respond to the energy service requests which each power consumer participates in.

Specifically, the operation planning unit 130 computes the charging/discharging plan by solving a mathematical programming problem for obtaining a variable (hereinafter, referred to as a "determination variable") that maximizes the objective function representing the profit of a plurality of power consumers owning each of a plurality of energy storage systems 400 under a constraint condition that is defined based on the energy service.

The determination variable includes the upper limit value (reserved frequency regulation energy Pfr_i,t) of the charging/discharging in accordance with the first energy service, the charging energy and/or a charging energy amount in accordance with other energy services, and the discharging energy and/or discharging energy amount in accordance with other energy services.

The objective function that represents the profit of a plurality of power consumers is defined based on the compensation (cinc_i,t) for the upper limit value (reserved frequency regulation energy Pfr_i,t) of the charging/discharging in accordance with the first energy service of each power consumer, and the power purchasing unit price (cprc_i,t) of each power consumer.

Hereinafter, an example of the constraint condition will be described. Note that, the constraint conditions are just examples, and the present invention is not limited thereto.

"The charging/discharging plan of the energy storage system 400 is computed up to 24 hours ahead at each constant interval."

"The determination variable is computed for each sub-time slot."

"The power purchasing unit price can be different for each time segment (for example, a daytime segment and a nighttime segment)."

"When participating in the peak-cut service, the energy storage system 400 discharges so that the power demand becomes equal to or smaller than a threshold value (Dmax_i) set in advance, and thus, the peak shift is performed."

"In the sub-time slots other than the sub-time slot in which the discharging for the peak shift is performed, the charging/discharging in accordance with other energy services can be performed."

"In the sub-time slot in which the discharging for the peak shift is performed, the charging/discharging in accordance with other energy services cannot be performed."

"Reserving the power for the peak shift is performed in a sub-time slot other than the sub-time slot for discharging for the peak shift is performed so as to prevent a state in which the discharging for the peak shift is not performed (a shortage of remaining capacity)."

"In the cost management service, the remaining capacity is managed in consideration of changes in the remaining capacity caused by the frequency regulation."

"The economic profit of each power consumer that is obtained by subtracting the electricity rate computed based on the power purchasing unit price (cprc_i,t) paid to the electric power company by each power consumer from the compensation (cinc_i,t) according to the reserved frequency regulation energy Pfr_i,t made by the frequency regulation service, is maximized."

"The reserved total frequency regulation energy obtained by adding the reserved frequency regulation energy Pfr_i,t of each power consumer in each sub-time slot is equal to or larger than a lower limit value of the reserved total frequency regulation energy set in advance in each sub-time slot."

"The discharging power of each of a plurality of energy storage systems 400 at each time does not exceed the power demand of each of the plurality of power consumers who owns each energy storage system 400 at each time (reverse power flow prevention)."

Equations 2 to 17 illustrate specific examples (objective function and the constraint conditions) of the mathematical programming problem based on these premises. Note that, the equations are merely examples, and the present invention is not limited thereto.

$$\underset{\substack{P_{fr\_i,t}, \\ P_{chg\_i,t}, \\ P_{dchg\_i,t}}}{\text{maximize}} \quad \sum_{i \in \mathcal{N}} \sum_{t \in \mathcal{T}} (c_{inc\_i,t} P_{fr\_i,t} - c_{prc\_i,t} P_{chg\_i,t} + c_{prc\_i,t} P_{dchg\_i,t}) \Delta \tau \quad \text{Equation 2}$$

$$P_{min\_i} \le P_{fr\_i,t} \le P_{max\_i}, t \in \mathcal{T}_{fr\_i} \quad \text{Equation 3}$$

$$P_{min\_i} \le P_{chg\_i,t} \le P_{max\_i}, t \in \mathcal{T}_{fr\_i} \quad \text{Equation 4}$$

$$P_{min\_i} \le P_{dchg\_i,t} \le P_{max\_i}, t \in \mathcal{T}_{fr\_i} \quad \text{Equation 5}$$

$$P_{fr\_i,t} = P_{min\_i}, t \in \mathcal{T}_{ps\_i} \quad \text{Equation 6}$$

$$P_{chg\_i,t} = P_{min\_i}, t \in \mathcal{T}_{ps\_i} \text{ or when } p_{chg\_i,t} = 0 \quad \text{Equation 7}$$

$$P_{dchg\_i,t} = P_{min\_i}, t \in \mathcal{T}_{ps\_i} \text{ or when } p_{dchg\_i,t} = 0 \quad \text{Equation 8}$$

$$P_{min\_i} \le P_{fr\_i,t} + P_{chg\_i,t} + P_{dchg\_i,t} \le P_{max\_i}, t \in \mathcal{T}_{fr\_i} \quad \text{Equation 9}$$

$$\Delta C_{fr\_i,t} = c_{closs\_i,t} P_{fr\_i,t} \Delta \tau, t \in \mathcal{T}_{fr\_i} \quad \text{Equation 10}$$

$$C_{i,t+1} = C_{i,t} + e_{chg\_i} P_{chg\_i,t} \Delta \tau - \frac{1}{e_{dchg\_i}} P_{dchg\_i,t} \Delta \tau - \Delta C_{fr\_i,t}, \quad \text{Equation 11}$$
$$t \in \mathcal{T}_{fr\_i}$$

$$C_{min\_i} + \frac{1}{e_{dchg\_i}} P_{fr\_i,t} \Delta \tau \le C_{i,t} \le C_{max\_i} - e_{chg\_i} P_{fr\_i,t} \Delta \tau, \quad \text{Equation 12}$$
$$t \in \mathcal{T}_{fr\_i}$$

$$C_{i,0} = C_{start\_i} \quad \text{Equation 13}$$

$$C_{i,t_{ps,end\_i,j}+1} = C_{i,t_{ps,start\_i,j}} - \quad \text{Equation 14}$$
$$\frac{1}{e_{dchg\_i}} \sum_{t \in \mathcal{T}_{ps\_i,j}} \max(D_{prd\_i,t} + \Delta D_{prd\_i,t} - D_{max\_i}, 0) \Delta \tau,$$
$$j \in \mathcal{N}_{ps\_i}$$

$$D_{prd\_i,t} + \Delta D_{prd\_i,t} + P_{fr\_i,t} + P_{chg\_i,t} - P_{dchg\_i,t} \le D_{max\_i}, \quad \text{Equation 15}$$
$$t \in \mathcal{T}_{fr\_i}$$

$$D_{prd\_i,t} + \Delta D_{prd\_i,t} - P_{fr\_i,t} + P_{chg\_i,t} - P_{dchg\_i,t} \ge D_{min\_i}, \quad \text{Equation 16}$$
$$t \in \mathcal{T}_{fr\_i}$$

$$\sum_{i \in \mathcal{N}} P_{fr\_i,t} \ge S_{min\_t}, t \in \mathcal{T} \quad \text{Equation 17}$$

Hereinafter, constants or coefficients appearing in the above equations, which were not described so far, are described.

Figure 6:
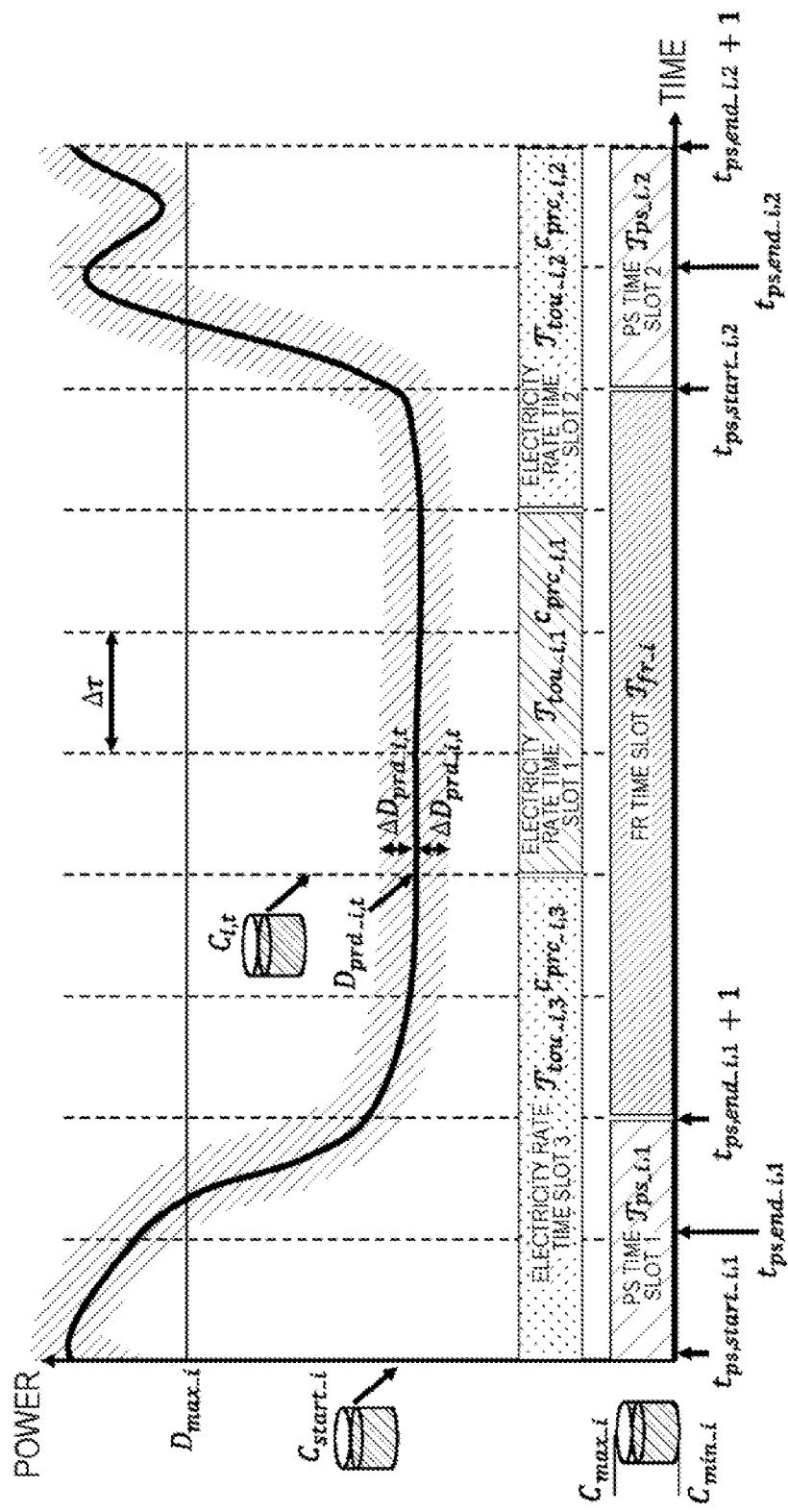
FIG. 6 is a diagram for explaining various kinds of information in the present example embodiment.

"$\Delta \tau$" is a time width [h] of the sub-time slot (refer to FIG. 6).

"Capital letter of $\tau$ (hereinafter referred to as "T")" is a set of identification numbers of the sub-time slots.

"N" is a set of identification numbers of the energy storage systems 400.

"Smin_t" is a lower limit value [W] of the reserved total frequency regulation energy in each sub-time slot.

"j" is an identification number assigned to each of the continuous discharging times for the peak shift. In a case of the example in FIG. 6, PS time slot 1 with j=1 and PS time slot 2 with j=2 are illustrated.

"Nps_i" is a set of PS time slots j for the discharging for the peak shift.

"k" is an identification number assigned to each time slot having different power purchasing unit prices. In a case of the example in FIG. 6, an electricity rate time slot 1 with k=1, an electricity rate time slot 2 with k=2, and an electricity rate time slot 3 with k=3 are illustrated.

"Ntou_i" is a set of electricity rate time slots k having different power purchasing unit prices.

"Tfr_i" is a set of numbers of sub-time slots in which the i-th energy storage system 400 performs charging/discharging for the frequency regulation service.

"Tps_i,j" is a set of identification numbers of sub-time slots included in PS time slot j in which the i-th energy storage system 400 performs discharging for the peak shift.

"Ttou_i,k" is a set of identification numbers of sub-time slots included in the electricity rate time slot k of the i-th energy storage system 400.

"tps,start_i,j" is an identification number of the first sub-time slot in the time-series order among the sub-time slots included in the PS time slot j in which the i-th energy storage system 400 performs discharging for the peak shift.

"tps,end_i,j" is an identification number of the last sub-time slot in the time-series order among the sub-time slots included in the PS time slot j where the i-th energy storage system 400 performs discharging for peak shift.

"pchg_i,t" is a value (binary value) indicating whether or not to permit the i-th energy storage system 400 to charge for a purpose other than the frequency regulation service in the t-th sub-time slot. "0" means that the charging is not permitted.

"pdchg_i,t" is a value (binary value) indicating whether or not to permit the i-th energy storage system 400 to discharge for a purposes other than the frequency regulation service in the t-th sub-time slot. "0" means that the discharging is not permitted.

"ccloss_i,t" is a parameter of the remaining capacity change model determined by the remaining capacity change model determination unit 120.

Figure 7:
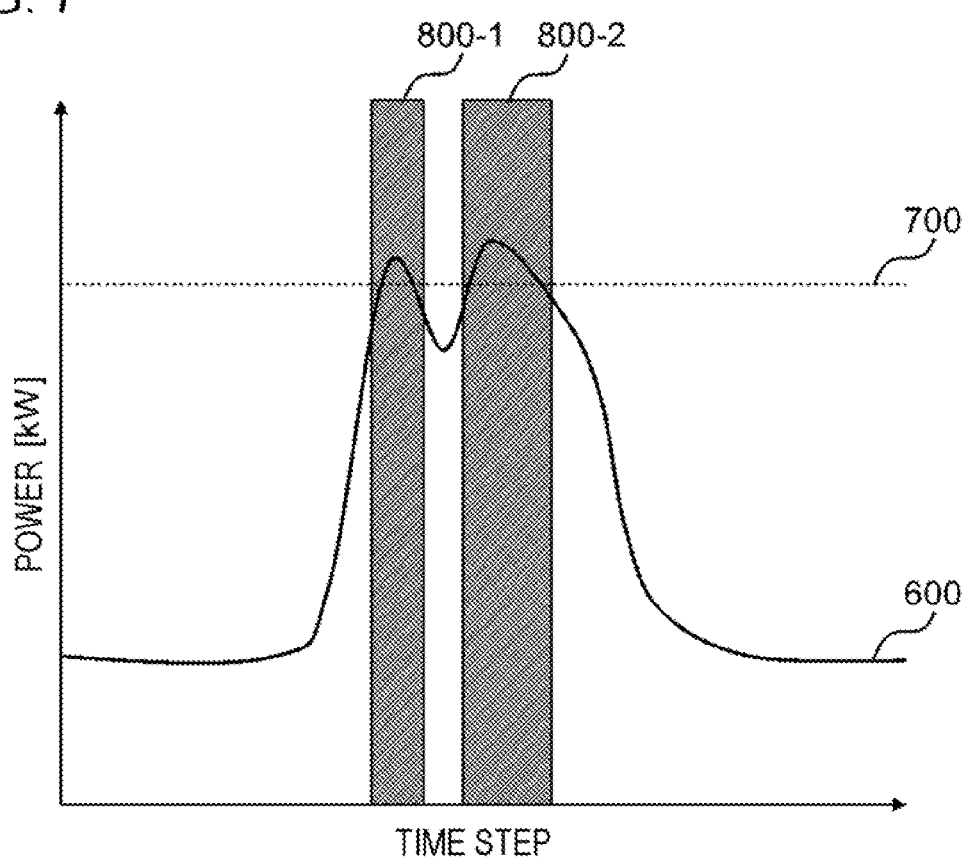
FIG. 7 is a diagram for explaining an example of processing for computing a peak shift time slot in the present example embodiment.

The values of these constants or coefficients may be acquired by the data acquisition unit 170 from the energy storage system 400, the input device connected to the control apparatus 100, or another external device configured to be able to communicate with the control apparatus 100, and may be stored in the energy storage parameter storage unit 160. Alternatively, the data acquisition unit 170 may compute the values and store in the energy storage parameter storage unit 160. Here, a processing example of computing the peak shift time slot Nps_i will be described. For example, as illustrated in FIG. 7, there is a method in which a power consumption predicted value 600 is compared with a threshold value 700, and a sub-time slot of which the power consumption predicted value 600 is equal to or larger than the threshold value 700 is determined as the peak shift time slot Nps_i. The power consumption predicted value 600 is, for example, the power consumption predicted value Dprd_i,t or the sum of the power consumption predicted value Dprd_i,t and its error width ΔDprd_i,t.

Next, Equations 2 to 17 will be described. Equation 2 represents an objective function. The objective function is defined as the sum of the economic profits in the entire sub-time slots (profits taking the received compensation due to the frequency regulation and the paid electricity rate into consideration). The determination variables are the reserved frequency regulation energy Pfr_i,t of each sub-time slot, the charging bias Pchg_i,t that is the charging power in accordance with other energy services, and the discharging bias Pdchg_i,t that is the discharging power in accordance with other energy services.

Equations 3 to 8 represent the constraints on the determination variable. Equations 3 to represent the constraints in the sub-time slot in which the discharging for the peak shift is not performed, and set the upper limit and the lower limit of the determination variable. Equation 6 represents a constraint in the sub-time slot for discharging for the peak shift, and Pfr it is defined as Pmin_i. Equation 7 represents a constraint in a sub-time slot in which the discharging for the peak shift is performed or in the sub-time slot in which the charging for a purpose other than the frequency regulation service is not allowed, and Pchg_i,t is defined as Pmin_i. Equation 8 represents a constraint in a sub-time slot in which the discharging is performed for the purpose of the peak shift or in a sub-time slot in which the discharging for a purposes other than the frequency regulation service is not allowed, and pdchg_i,t is defined as Pmin_i.

Equation 9 represents a constraint in the sub-time slot in which the discharging for the peak shift is not performed, and the constraint on the upper and lower limits of the charging/discharging output. The constraint condition is defined, in which the maximum charging/discharging output that is the sum of the reserved frequency regulation energy Pfr_i,t, the charging bias Pchg_i,t, and the discharging bias Pdchg_i,t, for each sub-time slot becomes the upper and lower limit range.

Equation 10 represents a constraint in a sub-time slot in which the discharging for the peak shift is not performed, and is a constraint on a temporal change of the remaining capacity based on the charging/discharging in accordance with the frequency regulation service. ccloss_i,t stored in the model storage unit 110 is used.

Equation 11 represents a constraint in the sub-time slot in which the discharging for the peak shift is not performed, and is an equality constraint of change of the remaining capacity. For each sub-time slot, the constraint condition is defined, in which the remaining capacity after one sub-time slot becomes the sum of the remaining capacity in the current sub-time slot, the increase and decrease of the remaining capacity due to the charging/discharging biases, and the predicted value of the amount of change of the remaining capacity due to the frequency regulation.

Expression 12 represents a constraint in the sub-time slot in which the discharging for the peak shift is not performed, and the constraint on the upper and lower limits of the remaining capacity. For each sub-time slot, it is necessary that the charging/discharging by the frequency regulation does not result in full charging or complete discharging even in a moment until the next sub-time slot. Therefore, for each sub-time slot, the constraint condition is defined, in which the remaining capacity falls within the upper and lower limit range obtained by adding the worst values of the increased and decreased values of the remaining capacity due to the charging/discharging for the frequency regulation to the maximum and minimum values as a margin.

Equation 13 represents the equality constraint of the initial remaining capacity. The constraint condition is defined, in which the remaining capacity Ci,0 in the first sub-time slot becomes the current remaining capacity Cstart_i of the energy storage system 400.

Equation 14 represents a constraint in the sub-time slot in which the discharging for the peak shift is performed, and represents an equality constraint of the remaining capacity after the end of the discharging for the peak shift. The constraint condition is defined, in which the remaining capacity in the next sub-time slot at the end of discharging for the peak shift becomes the remaining capacity when the power consumption (Dprd_i,t+ΔDprd_i,t) is discharged from the energy storage system 400 while considering the margin of prediction error from the remaining capacity at the start of the discharging for the peak shift.

Expression 15 represents a constraint in a sub-time slot in which the discharging for the peak shift is not performed, and represents an upper limit constraint for guaranteeing the discharging for the peak shift. The constraint condition is defined, in which the overestimated power demand (Dprd_i,t+ΔDprd_i,t+Pfr_i,t+Pchg_i,t−Pdchg_i,t) becomes equal to or smaller than Dmax_i in each sub-time slot.

Equation 16 represents a constraint in a sub-time slot in which the discharging for the peak shift is not performed, and represents a lower limit constraint for the reverse power flow prevention. The constraint condition is defined, in which the underestimated power demand (Dprd_i,t−ΔDprd_i,t−Pfr_i,t+Pchg_i,t−Pdchg_i,t) becomes equal to or larger than Dmin_i.

Equation 17 represents the lower limit constraint of the reserved total frequency regulation energy. It is defined so that the reserved total frequency regulation energy in each sub-time slot becomes equal to or larger than the lower limit value.

The mathematical programming problems defined in Equations 2 to 17 can be solved as linear programming. By solving the mathematical programming problems defined in Equations 2 to 17, as the charging/discharging plan to satisfy the energy service that each energy storage system 400 participates in, each value of the reserved frequency regulation energy Pfr_i,t in each sub-time slot, the charging bias Pchg_i,t which is the charging power in accordance with other energy services, and the discharging bias Pdchg_i,t which is a discharging power in accordance with other energy services, is obtained.

The operation planning unit 130 transfers each value obtained by solving the mathematical programming problems to the command value storage unit 150 to store as a command value. At this time, the command value and the time information relating to the sub-time slot are stored together. If old data exists, overwriting may be performed.

The data transmission unit 180 acquires the command value and the time information updated by the operation planning unit 130 from the command value storage unit 150, and transmits to each energy storage system 400.

Figure 8:
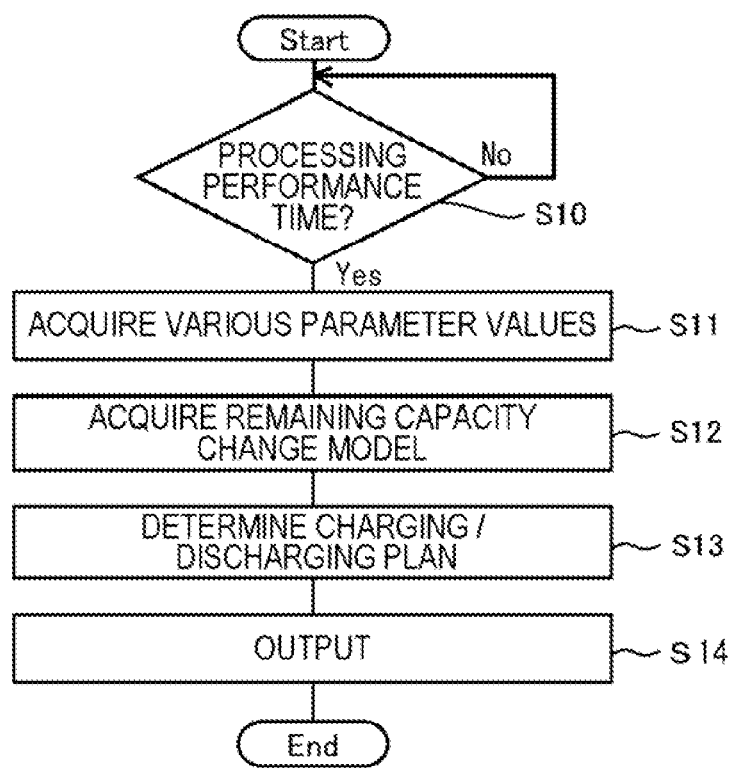
FIG. 8 is a flowchart illustrating an example of a flow of the processing by the control apparatus in the present example embodiment.

Here, an example of the flow of processing by the operation planning unit 130 and the data transmission unit 180 will be described by using the flowchart in FIG. 8.

When a processing performing time comes (Yes in S10), the operation planning unit 130 acquires various parameter values for solving the mathematical programming problems from the energy storage parameter storage unit 160 (S11). In addition, the operation planning unit 130 acquires the remaining capacity change model from the model storage unit 110 (S12). The processing order of S11 and S12 may be reversed, or may be performed in parallel. Thereafter, by solving the mathematical programming problem, the operation planning unit 130 computes the charging/discharging plan that satisfies the energy service that each energy storage system 400 participates in, and stores the results in the command value storage unit 150 (S13). Next, the data transmission unit 180 transmits the determined charging/discharging plan to each energy storage system 400.

The processing may be performed at constant interval (for example, every 15 minutes). In this case, in S10, it is determined whether or not the elapsed time from the previous processing performance time has reached a predetermined time.

In addition, the time interval for performing the processing may be different for each time slot. For example, in a time slot in which the change of the remaining capacity of the energy storage system 400 is relatively large, the processing may be performed every time t1, and in a time slot in which the change of the remaining capacity of the energy storage system 400 is relatively small, the processing may be performed at every time t2 (t1<t2). In this way, the processing can be performed at time suitable for each time slot, and it is possible to reduce the processing load on the computer while maintaining the required accuracy.

Note that, when the processing in S11 to S13 is performed one time, the charging/discharging plan of each energy storage system 400 up to 24 hours ahead will be determined, but the data transmission unit 180 may transmit the charging/discharging plan up to 24 hours ahead to each energy storage system 400, or may transmit only a part thereof (for example, the charging/discharging plan until the time when the processing in S11 to S13 is performed next) to the energy storage system 400. When only a part of the plan is transmitted to the energy storage system 400, it is possible to avoid the unnecessary transmitted and received data and to reduce the processing load.

Figure 9:
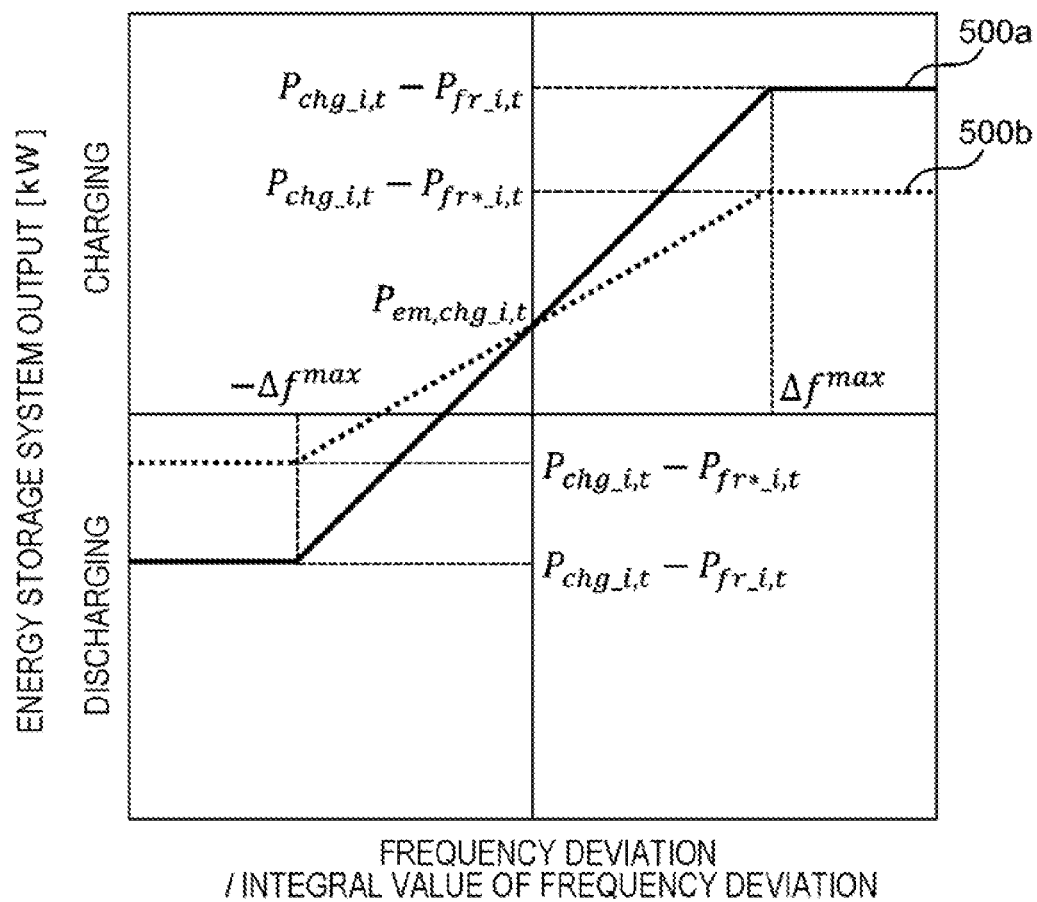
FIG. 9 is an example of a charging/discharging output function of the energy storage system in the present example embodiment.

Each energy storage system 400 controls the charging/discharging output based on the command value and the time information included in the received charging/discharging plan. FIG. 9 is an example of the charging/discharging output function of the energy storage system 400 with respect to the received command value. A charging/discharging output function 500a is a function that determines the charging/discharging output value of the energy storage system 400 according to the current value of the system frequency. The input value is a deviation between the current value of the system frequency and the reference value of the system frequency, or a time integral value of the deviation. It is also possible to limit the upper and lower limit range of the input value by setting a frequency deviation maximum value $\Delta f^{max}$. In addition, it is also possible to change the charging/discharging output function within a range that does not exceed the reserved frequency regulation energy Pfr_i,t, like a charging/discharging output function 500b.

The control apparatus 100 in the present example embodiment described above can realize the advantageous effect same as that of the first example embodiment. In addition, the control apparatus 100 in the present example embodiment makes it possible to solve the problem, caused by the difficulty of predicting of the system frequency, that the temporal change of remaining capacity based on the charging/discharging in accordance with the frequency regulation service cannot be planned, by determining the remaining capacity change model that estimates the amount of change of the remaining capacity per unit time. Then, by solving the problem, it becomes possible to realize the coexistence of the function of frequency regulation while supporting the backup, the peak shift, and the electricity rates according to the time slot, which are original functions of the energy storage system 400.

In addition, by defining the constraint condition based on at least two energy services as the constraint condition for the mathematical programming problem, it is possible to compute the charging/discharging plan for a plurality of energy storage systems so as to respond to a plurality of energy service requests. Note that, the charging/discharging in accordance with a plurality of energy services may be performed at the same time, or the charging/discharging in accordance with a plurality of the energy services may not be performed at the same time, but may be performed separately for each time slot. In any cases, by defining the mathematical programming problems as the constraint conditions, it is possible to compute the charging/discharging plan of a plurality of energy storage systems so as to satisfy the assumed condition.

Here, a modified example of the present example embodiment will be described. In the present example embodiment, the first energy service is the frequency regulation service, but the first energy service may be another energy service that causes the energy storage system 400 to perform charging/discharging within a range equal to or smaller than the upper limit value of the charging/discharging set in advance. In this case also, the same operation and effect can be realized by the same processing as in the second example embodiment.

Hereinafter, examples of reference aspects will be additionally described.

1. A control apparatus including: a remaining capacity change model determination unit that determines a remaining capacity change model that estimates a temporal change of a remaining capacity which is based on charging/discharging in accordance with a first energy service for each of a plurality of energy storage systems that perform charging/discharging in accordance with energy services; and an operation planning unit that computes a charging/discharging plan of each of the plurality of energy storage systems based on the remaining capacity change model of each of the plurality of energy storage systems.

2. The control apparatus according to 1, in which the remaining capacity change model determination unit determines the remaining capacity change model that estimates an amount of change of the remaining capacity for each unit time.

3. The control apparatus according to 2, in which the remaining capacity change model determination unit determines the remaining capacity change model for each energy storage system based on an upper limit value of the charging/discharging in accordance with the first energy service and a record of the amount of change of the remaining capacity for each unit time which is based on the charging/discharging in accordance with the first energy service.

4. The control apparatus according to any one of 1 to 3, in which the first energy service is a service that causes the energy storage system to perform charging/discharging within a range equal to or smaller than an upper limit value of the charging/discharging set in advance.

5. The control apparatus according to 4, in which the first energy service is a frequency regulation service that causes the energy storage system to perform charging/discharging according to a frequency fluctuation of a power system.

6. The control apparatus according to any one of 1 to 5, in which the remaining capacity change model is a linear function or a piecewise linear function.

7. The control apparatus according to any one of 1 to 6, in which the operation planning unit computes the charging/discharging plan by solving a mathematical programming problem for obtaining a variable that maximizes a function representing a profit of a plurality of power consumers who own each of the plurality of energy storage systems under a constraint condition determined based on the energy services.

8. The control apparatus according to 7, in which the variable includes an upper limit value of the charging/discharging in accordance with the first energy service, a charging power and/or a charging energy amount in accordance with other energy services, and a discharging power and/or a discharging energy amount in accordance with other energy services.

9. The control apparatus according to 7 or 8, in which the profit of the plurality of power consumers is defined based on a compensation for the upper limit value of the charging/discharging in accordance with the first energy service and a power purchasing unit price.

10. The control apparatus according to any one of 7 to 9, in which the constraint condition includes "a discharging power of each of the plurality of energy storage systems at each time does not exceed a power demand of each of the plurality of power consumers who owns each energy storage system at each time".

11. The control apparatus according to any one of 1 to 10, in which the operation planning unit computes the charging/discharging plan of each of the plurality of energy storage systems based on at least a part of a charging/discharging efficiency, a charging/discharging output upper limit, a charging/discharging output lower limit, a remaining capacity lower limit value, a remaining capacity upper limit value, and a current remaining capacity.

12. The control apparatus according to any one of 1 to 11, in which the operation planning unit computes the charging/discharging plan of each of the plurality of energy storage systems based on at least a part of a temporal change of a power consumption predicted value, a temporal change of an error of the power consumption predicted value, a compensation for an upper limit value of the charging/discharging in accordance with the first energy service, a power purchasing unit price, and an upper limit value of a power to be purchased.

13. The control apparatus according to any one of 1 to 12, in which the energy services include at least two of a frequency regulation service that causes the energy storage system to perform charging/discharging according to a frequency fluctuation of a power system, a backup service that keeps the energy storage system constantly charged with a predetermined power amount, a peak-cut service that causes the energy storage system to perform discharging when a power demand exceeds a threshold value, and a cost management service that determines a time for causing the energy storage system to perform charging/discharging based on a power purchasing unit price different for each time slot.

14. A power management system that includes: the control apparatus according to any one of 1 to 13; and a energy storage system that performs charging/discharging based on a charging/discharging plan determined by the control apparatus.

15. A control method executed by a computer, the method comprising:

a remaining capacity change model determination step of determining a remaining capacity change model that estimates a temporal change of a remaining capacity which is based on charging/discharging in accordance with a first energy service for each of a plurality of energy storage systems that perform charging/discharging in accordance with energy services; and an operation planning step of computing a charging/discharging plan of each of the plurality of energy storage systems based on the remaining capacity change model of each of the plurality of energy storage systems.

16. A program that causes a computer to functions as:

a remaining capacity change model determination unit that determines a remaining capacity change model that estimates a temporal change of a remaining capacity which is based on charging/discharging in accordance with a first energy service for each of a plurality of energy storage systems that perform charging/discharging in accordance with energy services; and an operation planning unit that computes a charging/discharging plan of each of the plurality of energy storage systems based on the remaining capacity change model of each of the plurality of energy storage systems.

Although the present invention has been described above with reference to the example embodiments (and the examples), the present invention is not limited to the example embodiments (and the examples). Various modifications that can be understood by those skilled in the art can be made to the configuration and details of the present invention within the scope of the present invention.

This application claims the priority based on Japanese Patent Application No. 2018-090731 applied on May 9, 2018, and the entire disclosure thereof is incorporated herein.

What is claimed is:
1. A control apparatus comprising:
at least one memory configured to store one or more instructions; and
at least one processor configured to execute the one or more instructions to:
   determine a remaining capacity change model that estimates a change of a remaining capacity which is based on charging/discharging in accordance with a first energy service for each of a plurality of energy storage systems that perform charging/discharging in accordance with energy services;
   compute a charging/discharging plan of each of the plurality of energy storage systems based on the remaining capacity change model of each of the plurality of energy storage systems;
   determine the remaining capacity change model that estimates an amount of change of the remaining capacity for each unit time; and
   determine the remaining capacity change model for each energy storage system based on an upper lim it value of the charging/discharging in accordance with the first energy service and a record of the amount of change of the remaining capacity for each unit time which is based on the charging/discharging in accordance with the first energy service,
wherein charging/discharging of at least one of the plurality of energy storage systems is controlled based on the charging/discharging plan.

2. The control apparatus according to claim 1,
wherein the first energy service is a service that causes the energy storage system to perform charging/discharging within a range equal to or smaller than an upper limit value of the charging/discharging set in advance.

3. The control apparatus according to claim 2,
wherein the first energy service is a frequency regulation service that causes the energy storage system to perform charging/discharging according to a frequency fluctuation of a power system.

4. The control apparatus according to claim 1,
wherein the remaining capacity change model is a linear function or a piecewise linear function.

5. The control apparatus according to claim 1,
wherein the processor is further configured to execute the one or more instructions to compute the charging/discharging plan by solving a mathematical programming problem for obtaining a variable that maximizes a function representing a profit of a plurality of power consumers who own each of the plurality of energy storage systems under a constraint condition determined based on the energy services.

6. The control apparatus according to claim 5,
wherein the variable includes an upper limit value of the charging/discharging in accordance with the first energy service, a charging power and/or a charging energy amount in accordance with other energy services, and a discharging power and/or a discharging energy amount in accordance with other energy services.

7. The control apparatus according to claim 5,
wherein the profit of the plurality of power consumers is defined based on a compensation for the upper lim it value of the charging/discharging in accordance with the first energy service and a power purchasing unit price.

8. The control apparatus according to claim 5,
wherein the constraint condition includes "a discharging power of each of the plurality of energy storage systems at each time does not exceed a power demand of each of the plurality of power consumers who owns each energy storage system at each time".

9. The control apparatus according to claim 1,
wherein the processor is further configured to execute the one or more instructions to compute the charging/discharging plan of each of the plurality of energy storage systems based on at least a part of a charging/discharging efficiency, a charging/discharging output upper limit, a charging/discharging output lower limit, a remaining capacity lower limit value, a remaining capacity upper limit value, and a current remaining capacity.

10. The control apparatus according to claim 1,
wherein the processor is further configured to execute the one or more instructions to compute the charging/discharging plan of each of the plurality of energy storage systems based on at least a part of a change of a power consumption predicted value, a change of an error of the power consumption predicted value, a compensation for an upper lim it value of the charging/discharging in accordance with the first energy service, a power purchasing unit price, and an upper limit value of a power to be purchased.

11. The control apparatus according to claim 1,
wherein the energy services include at least two of a frequency regulation service that causes the energy storage system to perform charging/discharging according to a frequency fluctuation of a power system, a backup service that keeps the energy storage system constantly charged with a predetermined power amount, a peak-cut service that causes the energy storage system to perform discharging when a power demand exceeds a threshold value, and a cost management service that determines a time for causing the energy storage system to perform charging/discharging based on a power purchasing unit price different for each time slot.

12. A control method executed by a computer, the method comprising:
   determining a remaining capacity change model that estimates a change of a remaining capacity which is based on charging/discharging in accordance with a first energy service for each of a plurality of energy storage systems that perform charging/discharging in accordance with energy services;
   computing a charging/discharging plan of each of the plurality of energy storage systems based on the remaining capacity change model of each of the plurality of energy storage systems;
   determining the remaining capacity change model that estimates an amount of change of the remaining capacity for each unit time; and
   determining the remaining capacity change model for each energy storage system based on an upper limit value of the charging/discharging in accordance with the first energy service and a record of the amount of change of the remaining capacity for each unit time which is based on the charging/discharging in accordance with the first energy service, wherein charging/discharging of at least one of the plurality of energy storage systems is controlled based on the charging/discharging plan.

13. A non-transitory storage medium storing a program that causes a computer to:
   determine a remaining capacity change model that estimates a change of a remaining capacity which is based on charging/discharging in accordance with a first energy service for each of a plurality of energy storage systems that perform charging/discharging in accordance with energy services;
   compute a charging/discharging plan of each of the plurality of energy storage systems based on the remaining capacity change model of each of the plurality of energy storage systems;
   determine the remaining capacity change model that estimates an amount of change of the remaining capacity for each unit time; and
   determine the remaining capacity change model for each energy storage system based on an upper limit value of the charging/discharging in accordance with the first energy service and a record of the amount of change of the remaining capacity for each unit time which is based on the charging/discharging in accordance with the first energy service,
   wherein charging/discharging of at least one of the plurality of energy storage systems is controlled based on the charging/discharging plan.

* * * * *